US010893648B2

(12) United States Patent
Paans

(10) Patent No.: US 10,893,648 B2
(45) Date of Patent: Jan. 19, 2021

(54) CULTIVATION FLOOR SYSTEM FOR CULTIVATION OF PLANTS

(71) Applicant: ErfGoed Nederland B.V., GH Moerkapelle (NL)

(72) Inventor: Hugo Willem Lambertus Paans, GH Moerkapelle (NL)

(73) Assignee: ERFGOED NEDERLAND B.V., GH Moerkapelle (NL)

(*) Notice: Subject to any disclaimer, the term of this patent is extended or adjusted under 35 U.S.C. 154(b) by 334 days.

(21) Appl. No.: 15/775,127

(22) PCT Filed: Nov. 10, 2016

(86) PCT No.: PCT/NL2016/050782
§ 371 (c)(1),
(2) Date: May 10, 2018

(87) PCT Pub. No.: WO2017/082726
PCT Pub. Date: May 18, 2017

(65) Prior Publication Data
US 2018/0368335 A1 Dec. 27, 2018

(30) Foreign Application Priority Data
Nov. 11, 2015 (NL) .................................. 2015771

(51) Int. Cl.
A01G 9/14 (2006.01)
A01G 7/00 (2006.01)
A01G 9/24 (2006.01)

(52) U.S. Cl.
CPC ............ A01G 9/1423 (2013.01); A01G 7/00 (2013.01); A01G 9/14 (2013.01); A01G 9/247 (2013.01); Y02A 40/25 (2018.01)

(58) Field of Classification Search
CPC ........ A01G 9/1423; A01G 9/247; A01G 9/14; A01G 9/0268; A01G 9/0263; A01G 9/0287
See application file for complete search history.

(56) References Cited

U.S. PATENT DOCUMENTS 2,150,257 A * 3/1939 Winandy ............. A01G 9/1423
47/18
2,502,910 A * 4/1950 Wilcox ................ A01G 9/1423
47/18

FOREIGN PATENT DOCUMENTS

DE 8808000 8/1988
WO 2014/126462 8/2014

OTHER PUBLICATIONS

International Search Report for PCT/NL2016/050782 dated Feb. 1, 2017 (2 pages).

* cited by examiner

Primary Examiner — Christopher D Hutchens
(74) Attorney, Agent, or Firm — Tutunjian & Bitetto, P.C.

(57) ABSTRACT

A cultivation floor system with a floor includes a watertight basin with a watertight groundsheet, a water-permeable structure in the basin, and a permeable top sheet which lies substantially horizontally over the water-permeable structure and forms the top side of the floor on which plant containers are optionally placed. The basin has a water-barrier structure which protrudes above the floor and delimits the compartment which is present on the floor. The water-barrier structure includes a horizontal beam with a top side, a water-barrier profile with a bottom side, and fastening means which fasten the water-barrier profile to the horizontal beam. The top side of the beam is substantially level with the top side of the floor formed by the permeable top sheet. The bottom side of the water-barrier profile is pulled onto (Continued)

the top side of the horizontal beam while clamping the watertight groundsheet and the permeable top sheet.

12 Claims, 3 Drawing Sheets

CULTIVATION FLOOR SYSTEM FOR CULTIVATION OF PLANTS

TECHNICAL FIELD

The invention relates to a cultivation floor system with a floor for cultivating plants.

BACKGROUND OF THE INVENTION

From the prior art, for example as described in WO2014/126462, a cultivation floor system is known in which plant containers are placed on the floor. Herein the known system comprises a watertight basin with a watertight groundsheet, a water-permeable structure in the basin, for example comprising one or more layers of granular material, and a permeable top sheet which runs substantially horizontally across the water-permeable structure and forms the top side of the floor.

For example, a protective sheet is placed over the watertight groundsheet and one or more layers of granular material are dumped on top thereof, for example a bottom layer with a coarse fraction of granular material and a top layer with a finer fraction. In known embodiments, one or more layers of volcanic rock and/or gravel are provided.

In practice, the top sheet is often a woven top sheet with pores between the yarns of the top sheet.

It is known from the prior art, for example, to provide an ebb and flood water installation which is configured to supply water, so that water is available to the plants situated on the top sheet in the plant containers in an ebb and flood regime. In known embodiments, the ebb and flood water installation comprises one or more irrigation lines in the basin, which irrigation lines have several openings along their length which allow water to flow from or into the one or more irrigation lines, in which the one or more irrigation lines are covered by and/or embedded in the water-permeable structure.

In practice, a cultivation floor system is used both inside and outside a greenhouse. In a known embodiment, the greenhouse, for example of the Venlo type, has a roof and roof support columns with a base which are arranged in one or more rows. In order to divide the cultivation floor into separate water compartments, for example in order to be able to produce separate ebb and flood regimes in different compartments, it is known to provide a water-barrier structure which is constructed in the known greenhouse by providing on a line of columns and between the successive bases, a raised kerbstone which protrudes above the top side of the floor. The groundsheet and the top sheet are then placed over this kerbstone and fixed on both sides of the upright kerbstone using an aluminium angle profile. In this case, the vertical leg of the angle profile abuts the side of the upright kerbstone and of the bases which are aligned therewith and the horizontal leg lies over the top sheet. This construction of the water-barrier structure known from the prior art is diagrammatically shown in FIG. 3 of this document.

OBJECTS OF THE INVENTION

The invention aims to provide an improvement for cultivation floor systems, in particular with regards to the installation and embodiment of the water-barrier structure which delimits a compartment of the cultivation floor.

SUMMARY OF THE INVENTION

The invention provides a cultivation floor system which is characterized in that the water-barrier structure comprises:

a horizontal beam with a top side,
a water-barrier profile with a bottom side,
fastening elements which fasten the water-barrier profile to the horizontal beam,
in which the top side of the beam is substantially level with the top side of the floor formed by the permeable top sheet,
in which a portion of the watertight groundsheet lies over the top side of the horizontal beam,
in which the permeable top sheet lies over the top side of the horizontal beam and over said portion of the watertight groundsheet,
and in which the bottom side of the water-barrier profile is pulled onto the top side of the horizontal beam by means of the fastening elements while clamping the watertight groundsheet and the permeable top sheet between said bottom side and top side.

This water-barrier structure makes it possible to achieve an efficient installation of the cultivation floor system. The clamping of both the groundsheet and the top sheet is situated in the plane of the floor and this effectively prevents both from shifting, in particular the top sheet, without undesired loads acting on the top sheet near the water-barrier structure. This is particularly advantageous if vehicles are driven across the floor. Moreover, in suitable embodiments, the width occupied by the water-barrier structure can be reduced to a significant degree compared to the abovementioned known water-barrier structure, which has an upright kerbstone which is as wide as the bases of the columns and also two angle profiles which cover a part of the top sheet. For example, it is possible to thus gain space for an additional row of plants, for example between the column bases, since no upright kerbstone has to be present there anymore.

In possible embodiments of the complete installation process of the cultivation floor, it is also possible to use the already installed beam in that installation process, or beams on either side of a compartment, for example as reference for the height of the water-permeable structure in the basin.

If desired, it may be provided that the water-barrier structure furthermore comprises a layer of sealant or similar sealing material which penetrates into the permeable top sheet and thus prevents or reduces internal horizontal leaking through the permeable top sheet.

In a possible embodiment, the beam is a tubular profile, for example a square or rectangular box profile.

For example, the beam and/or the water-barrier profile are made of plastic, recycled plastic or of metal, preferably of aluminium, optionally of stainless steel.

In an advantageous embodiment, the water-barrier profile is an angle profile, for example with a horizontal leg which is attached to the top side of the beam while clamping at least the groundsheet and the top sheet, and with an upright leg which determines the operational height of the water-barrier structure. In another embodiment, the water-barrier profile is, for example, a T profile which can be installed upside down.

In a possible embodiment, the cultivation floor system is intended for cultivating plants on floats, for example on floating plastic panels, for example of polystyrene, which float continuously on a layer of water on top of the cultivation floor. In this embodiment, it may be provided that the water-barrier profile is higher than 10 centimetres, for example about 20 centimetres high. For a cultivation floor system with an ebb and flood regime, a less high water-barrier structure usually suffices.

In an embodiment, the fastening elements are, for example bolts or screws, for example self-tapping screws.

In an embodiment, the water barrier forms a water-barrier structure between two neighbouring compartments of the cultivation floor system, but the water-barrier structure may of course also be provided along an edge of the cultivation floor.

The cultivation floor according to the invention may optionally be used outside, but also, and advantageously, in a greenhouse, for example with a translucent roof, for example with a roof of glass or plastic panels supported by columns, or in an arched greenhouse with supporting arches, for example for a plastic film roof which is provided over the arches.

For example, a greenhouse is provided with a roof and roof support columns with a base, which roof support columns are arranged in one or more parallel rows and support the roof. In this case, it is provided that the horizontal beam of the water-barrier structure extends along a row of bases and is attached to a side of said bases of a row of roof support columns. For example, the base is made of concrete and the column standing on top thereof is made of metal. Other embodiments, for example with a base as a prolongation of the column itself, are also conceivable. Preferably, it is provided in this case that the water-barrier profile also extends along the sides of the row of bases of the roof support columns and is attached to a side of these bases of a row of roof support columns. As a result thereof, the water-barrier profile is supported by the bases which, in practical embodiments, are higher than this profile.

The solution according to the invention makes it possible, for example, to place a row of plants in the space between successive column bases, directly next to the water-barrier profile, as a result of which additional floor space is created compared to a known water-barrier structure whose upright kerbstone has the same width as the column bases and runs directly between the column bases.

Fixing the beam to the base of a column may be effected, for example, using a mounting clamp positioned around the base and attached to the beam on either side of the column. For ease of installation, an embodiment is envisaged in which the beam is fixed to the column base using a C-shaped clamp, such as a gluing clamp. For example, the C-shaped clamp has a C-shaped body with a fixed clamping head at one end and with an adjustable spindle through the other end, in which the spindle has a displaceable clamp head. This C-shaped clamp can then be placed underneath the beam, so that it will ultimately be out of sight. This clamp makes it easy, for example, to keep the beam level and then fix it by clamping it to the base of the column.

In a possible embodiment, the beam is provided with through-holes, for example holes which have been provided beforehand, for example between the sides of the beam, so that for example legs of a mounting clamp can be inserted through one or more of such holes in the beam in order to pull the beam against a column base.

In a possible embodiment, it is provided that the beam forms part of the foundation of a greenhouse, for example that the roof columns or roof arches of the greenhouse rest directly on the beam which then serves as a foundation element.

In a possible embodiment, it is provided that the water-barrier structure has a second function, for example serves as and/or is configured as a rail for guiding and/or supporting a vehicle which drives on the rail and/or the floor. For example, water-barrier structures on either side of a compartment may serve as supporting rails for a robot vehicle which, in automated fashion, places plant containers on the floor and/or lifts them up from the latter. Or a water-barrier structure may, on one side of a compartment, serve as a guide rail for such a robot vehicle.

Also, or alternatively, it is possible for position-determining features to be provided at regular distances along the length of the water-barrier profile and/or the beam, for example permanent magnets, for a robot vehicle or other automated machine which is used in combination with the cultivation floor.

For example, the water-barrier profile has an upright leg which serves as a water-barrier structure and another profile portion, for example another upright leg. In another embodiment, a rail profile is fitted to the top side of the beam in addition to the water-barrier profile.

In a possible embodiment, it is provided that the water-barrier profile is composed of two profile elements, with a bottom element which is pulled against the top side of the beam and with a top element which is to be attached to said bottom element. Consequently, for example, one and the same bottom profile element could be used for many floors, with variants of the top water-barrier profile element being available, depending on the intended function and/or height of the water-barrier structure.

The invention also relates to a method for installing a cultivation floor as described herein, which method comprises:

placing the horizontal beam in such a way that its top side is substantially level with the intended plane of the floor, placing a portion of the watertight groundsheet over the horizontal beam, providing the water-permeable structure in the basin, placing the permeable top sheet in such a way that a portion thereof lies over the horizontal beam and over the portion of the watertight groundsheet situated over the latter, optionally, providing a layer of sealant which penetrates into the permeable top sheet and thus further prevents internal horizontal leaking through the permeable top sheet, placing the water-barrier profile and pulling the bottom side of said water-barrier profile onto the top side of the horizontal beam by means of the fastening elements while clamping the watertight groundsheet and the permeable top sheet between said bottom side and said top side.

As has been mentioned above, in a greenhouse having roof support columns with associated bases, the beam, and preferably also the water-barrier profile, are attached to the side of a row of column bases. Preferably, use is made in this case of the aforesaid C-shaped clamps to clamp the beam onto the column bases.

The invention also relates to a method for cultivating plants, preferably in a greenhouse, in which use is made of a cultivation floor system or greenhouse as described herein.

Plastic pots, for example provided with holes on the bottom side, may be used as plant containers, but other plant containers are also known. For example, the pot is made of porous and/or biological material, such as coconut fibre, or there is no pot and the plant container consists, for example, of a block of growth substrate, for example of rock wool or the like.

The invention will be explained below in more detail by means of the drawings.

DETAILED DESCRIPTION

Figure 1:
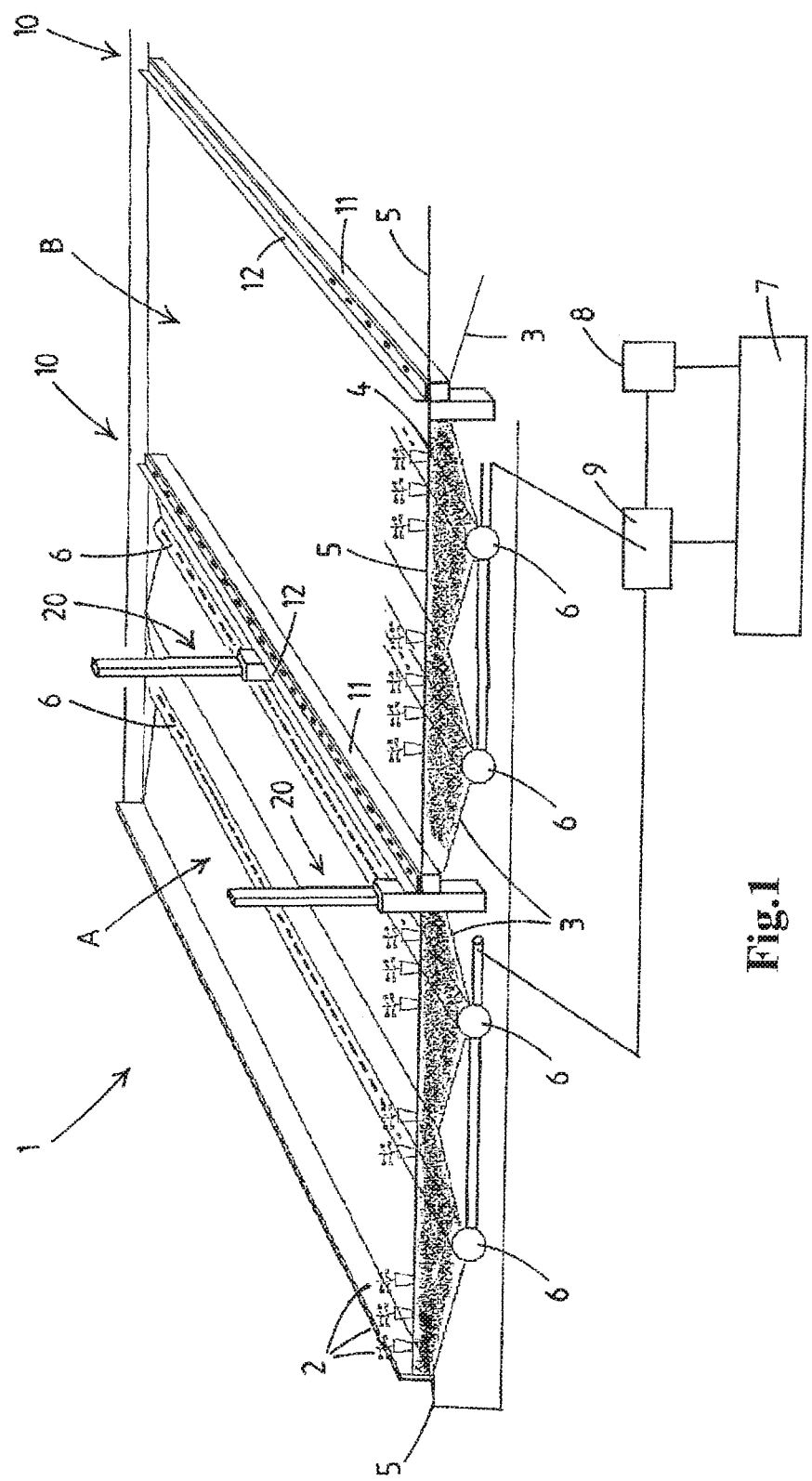
FIG. 1 diagrammatically shows a cut-away view of a cultivation floor installation according to the invention, FIG. 2 diagrammatically shows a sectional view of the construction of a water-barrier structure of a cultivation floor according to the invention, and FIG. 3 diagrammatically shows a sectional view of the construction of a prior-art water-barrier structure of a cultivation floor in a greenhouse.

FIG. 1 diagrammatically shows a portion of a greenhouse which is provided with a cultivation floor system 1 with a floor on which plant containers 2 containing plants are placed.

The cultivation floor system comprises a watertight basin with a watertight groundsheet 3 which is spread across a suitably shaped soil base.

In the basin, on the watertight groundsheet, optionally with the interposition of a protective sheet over the groundsheet, there is a water-permeable structure, in this case with a layer of granular material 4. For example, the water-permeable structure is completely or partly constructed using one or more layers of volcanic rock, gravel, and/or other granular material. If desired, the water-permeable structure may comprise one or more water-permeable mats.

The cultivation floor system furthermore comprises a permeable top sheet 5 which lies substantially horizontally over the water-permeable structure 4 and forms the top side of the floor on which plant containers 2 containing plants are placed. In embodiments, the permeable top sheet 5 may slope slightly, as is known from the prior art.

In this example, the cultivation floor system furthermore comprises an ebb and flood water installation which is configured to supply and discharge water so that water is available for the plants in plant containers 2 arranged on the floor in an ebb and flood regime.

For example, the ebb and flood water installation comprises irrigation lines 6 which have openings distributed along their length which make it possible for water to flow out of or into the one or more irrigation lines, so that the desired change between ebb and flood can be produced. The irrigation lines 6 are covered by and/or embedded in the water-permeable structure 4. Other embodiments of the water installation, optionally for an ebb and flood regime, are also conceivable in combination with the invention, for example with a drip watering installation.

A water storage 7 is provided, for example a store pond or an underground water store, from which water can be pumped via pump 8 to supply water to the basin 3 until a water level is achieved on the top sheet 5. When this "flood situation" has lasted sufficiently long, the water is allowed to flow away to the storage 7 via the lines 6. A valve assembly 9 may be provided to regulate the desired supply of water to the basin and/or discharge from the basin.

In the illustration from FIG. 1, two so-called compartments A and B of the floor are indicated diagrammatically. The water installation makes it possible to achieve an ebb and flood regime in each of these neighbouring compartments A, B separately.

Between the compartments A and B, and for example also at the border with a next compartment, as can be seen in the FIG. 1, the watertight basin comprises a water-barrier structure 10 which protrudes above the floor and, in case of flood, delimits the compartments A, B which are present on the floor.

Figure 2:
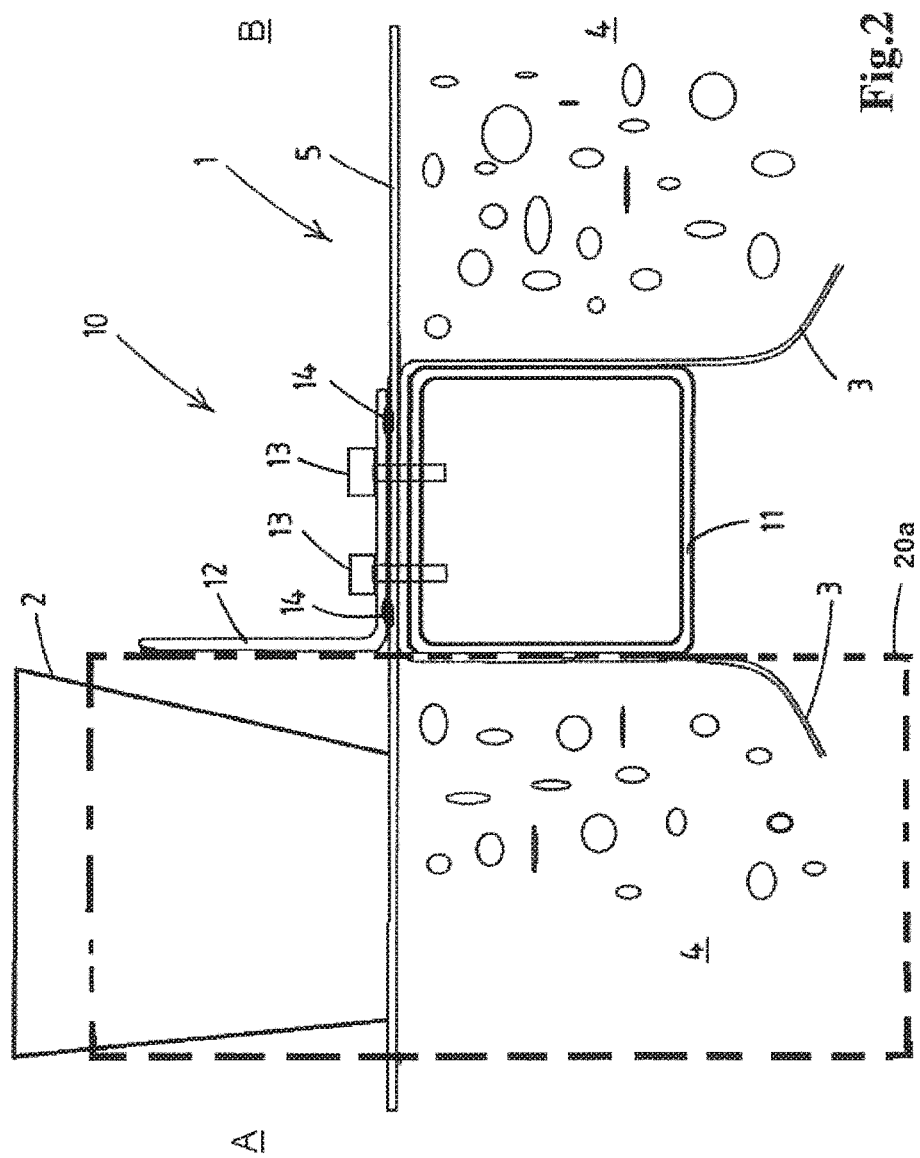

The illustration in FIG. 2 shows in particular that the illustrated exemplary embodiment of the water-barrier structure according to the invention comprises:
a horizontal beam 11 with a top side,
a water-barrier profile 12 with a bottom side, and
fastening elements 13 which fasten the water-barrier profile 12 to the horizontal beam 11.

It can be seen that the top side of the beam 11 is substantially level with the top side of the floor which is formed by the permeable top sheet 5. In practice, it will be possible to install the beams 11 first in such a way that their top sides are exactly level and at the same height everywhere.

If the beam elements 11, as is preferred, are in line with one another and thus in fact form one long horizontal beam as a lateral edge of a compartment A, B of the cultivation floor, said horizontal beam 11 may be used to finish the top side of the water-permeable structure 4 so that it is level and at the correct height. For example, it may be provided that such a beam 11 is present on either side of a compartment which is then used as a height reference for a machine which then makes the top side of the structure 4, for example made of granular material.

It can be seen that a portion of the watertight groundsheet 3 lies over the top side of the horizontal beam 11. This may be achieved by laying down a single-piece groundsheet, but it may also be provided to attach a separate watertight edge flap to the groundsheet, which is then preferably draped across the horizontal beam. The groundsheet, or the aforesaid edge flap, may, if desired, continue into the neighbouring compartment.

The permeable top sheet 5 of the cultivation floor comes to lie over the top side of the horizontal beam 11 and over that portion of the watertight groundsheet 3. Optionally, a protective sheet and/or a perforated film is present directly under the top sheet, as is known from the prior art.

As can be seen, in particular in FIG. 2, the bottom side of the water-barrier profile 12 is pulled onto the top side of the horizontal beam 11 by means of the fastening elements 13 while clamping the watertight groundsheet 3 and the permeable top sheet 5 between said bottom side and top side.

The fastening elements 13 are, for example, screws, for example self-tapping screws, which are inserted into holes in the water-barrier profile 12 and then screwed into the beam 11. Optionally, holes are predrilled into the profile 12 and/or the beam 11 for these fastening elements.

Optionally, it is provided that the water-barrier structure furthermore comprises a layer of sealant 14, preferably in the clamped area between the beam 11 and the profile 12, which penetrates into the permeable top sheet 5 and thus prevents or reduces internal horizontal leaking through the permeable top sheet 5. The sealant 14 may, if desired, have a relatively low viscosity in order thus to easily penetrate into the top sheet 5 and fulfil the ultimate function there. Whether or not a sealant layer 14 is desirable partly depends on the horizontal water permeability of the top sheet 5.

In the illustrated embodiment, the beam 11 is a tubular profile, for example made of plastic material.

In the illustrated embodiment, a substantially square box profile is shown as a beam with a completely flat top side, bottom side and sides. This makes the beam easy to install. Other cross-sectional shapes of the beam, for example having a solid, non-hollow cross section, or having an I-shaped cross section, etc., are also conceivable.

In the illustrated embodiment, the water-barrier profile 12 is an angle profile, for example having legs of equal length, or an L-profile, for example made of metal or plastic. The bottom side of the horizontal leg of the profile 12 is on the top side of the beam 11 and is fixed thereto by means of the fastening elements 13. The fastening elements are, for example, self-tapping screws.

The vertical leg of the profile 12 is sufficiently high to retain the water of each of the compartments A, B at the highest flood level in the respective compartment.

The water-barrier structure thus obtained forms an effective water-barrier structure between two neighbouring compartments A, B of the cultivation floor system. As has been mentioned, the same water-barrier structure may also be provided along an edge of a compartment which does not directly border onto a neighbouring compartment, for example along an edge of the cultivation floor at a wall of the greenhouse and/or at a path, etc.

As a person skilled in the art will recognise, the illustration of FIG. 1 shows that the water-barrier structure is combined in an attractive way with the construction supporting the roof (not shown) of the greenhouse, for example made of glass, for example of the Venlo type.

This roof support structure comprises roof support columns 20, 21 or columns, with a base 20a, optionally made of concrete, which roof support columns are arranged in parallel rows and support the roof. FIG. 2 shows a base 20a with thick dashed lines.

It can be seen that the horizontal beam 11 which is preferably composed of several beam element extends along a row of columns, here along the bases 20a, and is attached on a side of these column bases 20a of a row of roof support columns 20, 21. Use is made, for example, of a mounting clamp which can be placed around the column base 20a and which is attached to the beam 11 on either side of the column base or column.

It can be seen that the water-barrier profile 12 which may also be composed of several profile elements extends along the row of columns 20, 21. In the illustrated example, the profile 12 extends along the column bases of the roof support columns and the profile 12 is attached to a side of these column bases of a row of roof support columns. If desired, a mounting clamp may be used therefor as well.

The illustrated cultivation floor, optionally in a greenhouse, may be installed, for example, by first suitably shaping a sandbed or another bottom bed, for example with channels for the irrigation lines and with bed surfaces sloping towards said channels, as shown in FIG. 1.

Subsequently, beam elements may be arranged along one or more edges of a compartment A, B to be formed which together form in each case a horizontal beam. These beam elements 11 are, for example, fixed to the columns 20, 21 or the bases thereof. In this case, it may be ensured that the top side of the beam 11 is level and at a height which substantially corresponds to the intended plane of the floor.

The watertight groundsheet 3, or a separate edge flap thereof, optionally an edge flap having a thickness, quality or the like which differs from that of the part of the film 3 situated under the structure 4, is then placed over the beam 11 and obviously also over the bottom bed, optionally also in the possible channels for the irrigation lines 6.

Then, the water-permeable structure 4 is created in the basin, for example by dumping and levelling one or more layers of granular material. In this case, the top side of this structure 4 is then preferably taken to the same height as the top side of the beam 11. The top side of the beam 11 may in this case be used as reference for accurately shaping the top side of the structure 4, for example that a tool is used which engages with the beam 11 or even with two beams 11 for shaping the intermediate part of the structure 4.

Thereafter, the permeable top sheet 5 is put into place, optionally with one or more other sheets, mats and/or films, directly under the top sheet, in such a way that a portion thereof lies over the horizontal beam 11 and over the portion of the watertight groundsheet 3 which is situated on top of the latter. A film with perforations which reduces evaporation of moisture from the structure 4 situated underneath is provided, for example.

After the sealant 14 has been applied, the water-barrier profile 12 is installed and its bottom side is pulled onto the top side of the horizontal beam by means of the fastening elements 13, while clamping the watertight groundsheet 3 and the permeable top sheet 5. Thus, a water-barrier structure is produced in a simple manner. The sealant 14 may preferably penetrate into the top sheet and thus prevent or reduce internal horizontal leaking through the permeable top sheet.

The illustration of FIG. 2 shows that the water-barrier structure may have a slim embodiment, that is to say a small width, for example less than 12 centimetres, for example approximately 6 centimetres. In particular, it is possible to design the water-barrier structure to be slimmer than the column base and to let it run along a row of column bases. As a result thereof, for example, an additional row of plants may be arranged directly next to the water-barrier structure 12 and between the columns or column bases, which increases the yield of the cultivation floor.

The illustration of FIG. 2 also shows that the water-barrier profile 12 may be designed to have a small cross-sectional volume, such as the illustrated angle profile shape. This is advantageous, for example, because relatively little heat is then stored in said profile 12 with a view to heat accumulation in said profile, so that no undesired climate deviation is produced locally for plants 2 which are placed directly next to the profile 12.

Figure 3:
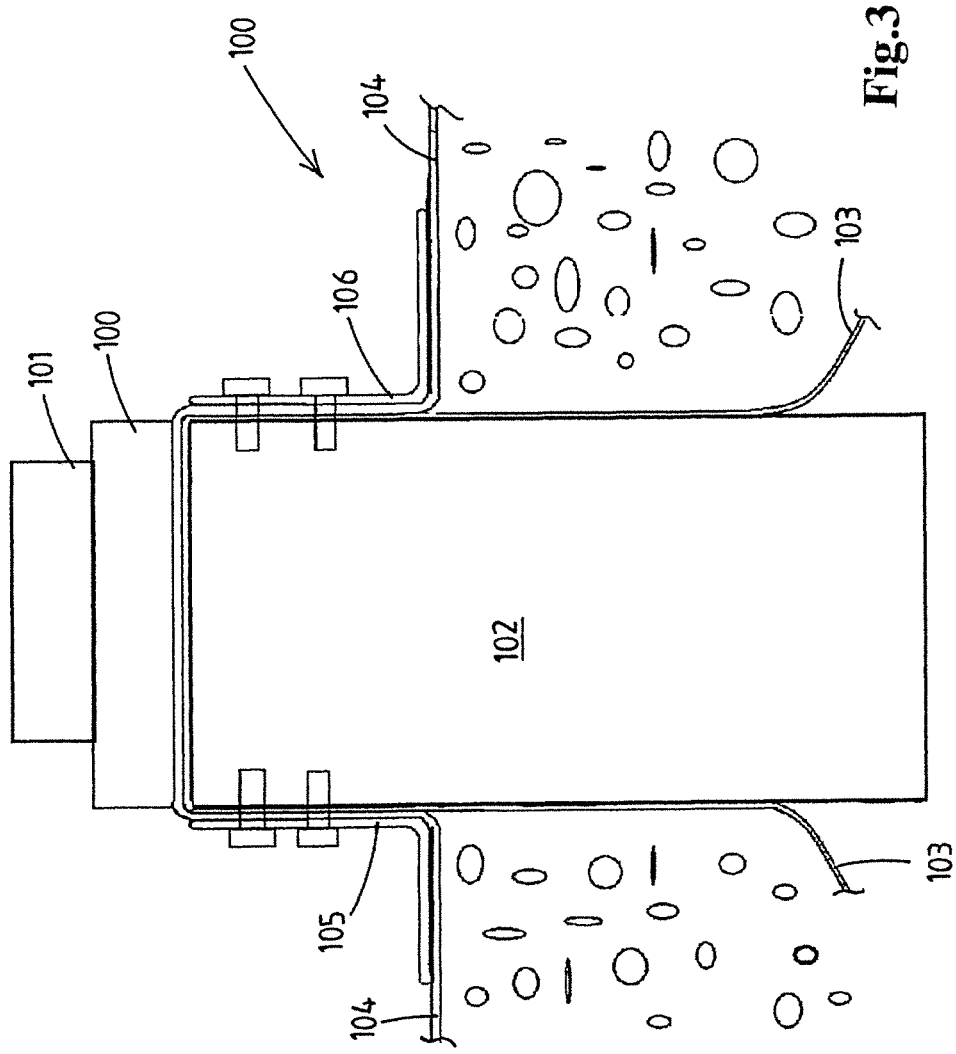

To illustrate the prior art described in the introduction, FIG. 3 diagrammatically shows a cross section of the construction of a water-barrier structure of a cultivation floor according to the prior art in a greenhouse.

A column base 100 with the roof support column 101 resting thereon of a roof of a greenhouse which is not shown in any more detail can be seen. Here, the column base 100 protrudes over the upright kerbstone 102, usually a kerbstone made of brick or concrete which forms part of a water-barrier structure and is arranged on the line of the columns 101, between the successive bases 100. It can be seen that the kerbstone 102 is as wide as the column base 100 and projects over the top side of the floor.

The watertight groundsheet 103 and the permeable top sheet 104 are laid over said kerbstone 102 and are fixed to both upright sides of said upright kerbstone 102 by means of an aluminium angle profile 105, 106. In this case, the vertical leg of the angle profile 105, 106 lies against the upright side of the upright kerbstone and of the bases 100 which are in line therewith and the horizontal leg lies over the top sheet 104.

The invention claimed is:

1. A cultivation floor system with a floor for cultivating plants, comprising:
    a watertight basin with a watertight groundsheet,
    a water-permeable structure in the basin,
    a permeable top sheet which lies substantially horizontally over the water-permeable structure and forms the top side of the floor,
in which the watertight basin comprises a water-barrier structure which protrudes above the floor and delimits a water compartment of the cultivation floor system,
wherein the water-barrier structure comprises:
    a horizontal beam with a top side,
    a water-barrier profile with a bottom side, fastening elements which fasten the water-barrier profile to the horizontal beam, in which the top side of the beam is substantially level with the top side of the floor formed by the permeable top sheet, in which a portion of the watertight groundsheet lies over the top side of the horizontal beam, in which the permeable top sheet lies over the top side of the horizontal beam and over said portion of the watertight groundsheet, and in which the bottom side of the water-barrier profile is pulled onto the top side of the horizontal beam by means of the fastening elements while clamping the watertight groundsheet and the permeable top sheet between said bottom side and top side.

2. The cultivation floor system according to claim 1, in which the water-barrier structure furthermore comprises a layer of sealant which penetrates into the permeable top sheet and thus prevents or reduces internal horizontal leaking through the permeable top sheet.

3. The cultivation floor system according to claim 1, in which the beam is a tubular profile.

4. The cultivation floor system according to claim 1, in which the water-barrier profile is an angle profile with a horizontal leg which is attached to the top side of the beam while clamping at least the groundsheet and the top sheet, and with an upright leg which determines an operational height of the water-barrier structure.

5. The cultivation floor system according to claim 1, in which the fastening elements comprise screws.

6. The cultivation floor system according to claim 1, in which the water-barrier structure forms a water barrier between two neighbouring compartments of the cultivation floor system.

7. The cultivation floor system according to claim 1, in which the system furthermore comprises an ebb and flood water installation which is configured to supply and discharge water so that water is available for the plants in plant containers placed on the cultivation floor in an ebb and flood regime.

8. A greenhouse provided with a cultivation floor system according to claim 1, in which the greenhouse has a roof and roof support columns with a base, which roof support columns are arranged in one or more parallel rows and support the roof, in which the horizontal beam extends along a row of bases of a row of roof support columns and is attached to a side of said bases.

9. The greenhouse according to claim 8, in which the water-barrier profile extends along the row of bases of the roof support columns and is attached on a side of said bases of a row of roof support columns.

10. A method for installing a cultivation floor according to claim 1, which method comprises:

placing the horizontal beam in such a way that its top side is substantially level with an intended plane of the cultivation floor, placing a portion of the watertight groundsheet over the horizontal beam, providing the water-permeable structure in the basin, placing the permeable top sheet in such a way that a portion thereof lies over the horizontal beam and over the portion of the watertight groundsheet situated over the horizontal beam, placing the water-barrier profile and pulling the bottom side of said water-barrier profile onto the top side of the horizontal beam by means of the fastening elements while clamping the watertight groundsheet and the permeable top sheet between said bottom side and said top side.

11. The cultivation floor system according to claim 1, in which the system furthermore comprises an ebb and flood water installation which comprises one or more irrigation lines in the basin, which one or more irrigation lines have several openings along a length of said one or more irrigation lines, which openings allow water to flow from or into the one or more irrigation lines, in which the one or more irrigation lines are covered by and/or embedded in the water-permeable structure.

12. The cultivation floor system according to claim 1, in which the top sheet is a woven top sheet with pores between yarns of the top sheet.

* * * * *